(12) United States Patent
Lee et al.

(10) Patent No.: US 10,791,494 B2
(45) Date of Patent: Sep. 29, 2020

(54) VEHICLE-TO-VEHICLE COMMUNICATION APPARATUS OF VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventors: Sangseok Lee, Yongin-Si (KR); Youngwoo Park, Yongin-Si (KR); Hyewon You, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 61 days.

(21) Appl. No.: 16/204,896

(22) Filed: Nov. 29, 2018

(65) Prior Publication Data

US 2020/0092789 A1    Mar. 19, 2020

(30) Foreign Application Priority Data

Sep. 18, 2018 (KR) .......................... 10-2018-0111700

(51) Int. Cl.
| | |
|---|---|
| H04W 40/20 | (2009.01) |
| H04W 4/46 | (2018.01) |
| G06F 8/65 | (2018.01) |
| H04B 17/318 | (2015.01) |
| H04W 8/00 | (2009.01) |
| H04W 8/24 | (2009.01) |
| H04W 40/12 | (2009.01) |
| H04W 84/18 | (2009.01) |

(52) U.S. Cl.
CPC .............. *H04W 40/20* (2013.01); *G06F 8/65* (2013.01); *H04B 17/318* (2015.01); *H04W 4/46* (2018.02); *H04W 8/005* (2013.01); *H04W 8/245* (2013.01); *H04W 40/12* (2013.01); *H04W 84/18* (2013.01)

(58) Field of Classification Search
CPC ....... H04W 40/20; H04W 4/46; H04W 8/005; H04W 8/245; H04W 40/12; H04W 84/18; G06F 8/65; H04B 17/318
See application file for complete search history.

(56) References Cited

U.S. PATENT DOCUMENTS

| | | | |
|---|---|---|---|
| 2015/0189043 A1* | 7/2015 | Cha .................... | H04M 15/8214 709/219 |
| 2015/0249541 A1* | 9/2015 | Stahln .................. | H04W 4/046 370/312 |

\* cited by examiner

*Primary Examiner* — Dady Chery
(74) *Attorney, Agent, or Firm* — Morgan, Lewis & Bockius LLP

(57) ABSTRACT

A vehicle-to-vehicle communication apparatus for a vehicle includes: a communicator configured to communicate with a server and adjacent vehicles; and a controller configured to store a position of the vehicle, to select one or more vehicles, among the adjacent vehicles, wherein the one or more vehicles are capable of performing local communication with the vehicle within a reference distance from the stored position, to receive download quota from a first host vehicle among the selected one or more vehicles, and to obtain data from the server as much as the received quota.

17 Claims, 9 Drawing Sheets

VEHICLE-TO-VEHICLE COMMUNICATION APPARATUS OF VEHICLE AND METHOD FOR CONTROLLING THE SAME

CROSS-THRESHOLD TO RELATED APPLICATION(S)

This application is based on and claims priority to Korean Patent Application No. 10-2018-0111700, filed on Sep. 18, 2018, in the Korean Intellectual Property Office, the disclosure of which is incorporated by threshold herein in its entirety.

TECHNICAL FIELD

The present disclosure relates to a vehicle and a control method of vehicle, and more particularly, to a vehicle mutually storing data based on a communication among vehicles, and a control method thereof.

BACKGROUND

Recent vehicles have various and complex functions, and accordingly, the vehicles have a variety of software programmed therein.

Particularly, upgrade of software for adding new functions and error correction is necessary, and thus it leads to an increase in inconvenience of the user.

For the upgrade of the software for vehicle, a user needs to visit the service center in person or access a website and then directly check the software before downloading the software.

Particularly, as for the software for vehicle, in general, a new version is released every quarter and thus a user is required to upgrade frequently.

For example, the user needs to update map data for the navigation of the vehicle once a quarter. In addition, the user needs to manually separate a memory mounted in the vehicle to download the data into the memory and then re-mount the memory to the vehicle for every update.

In addition, since the map data has 4 Gigabytes (GB) to 5 GB, and sometimes the map data has 10 GB or more, it takes a significantly long period of time to download the map data on a web-page.

For example, as Firmware over the air (FOTA) image is becoming larger, communication cost is magnificently increased for downing the data by using the FOTA method.

Further, in order to maintain the download speed, it is required to increase content delivery network (CDN) which leads to increase of the cost.

SUMMARY

It is an aspect of the present disclosure to provide a vehicle capable of conveniently downloading latest software without requiring a user to visit a service center in person, to access a web-page or to use a universal serial bus (USB) for upgrading software for vehicle, and a control method thereof.

It is another aspect of the present disclosure to provide a vehicle capable of reducing communication cost and a required time for downloading data, by reducing FOTA data by using peer to peer (P2P) communication among a plurality of vehicles in the short range communication network, and a control method thereof.

Additional aspects of the present disclosure will be set forth in part in the description which follows and, in part, will be obvious from the description, or may be learned by practice of the present disclosure.

In accordance with an aspect of the disclosure, a vehicle-to-vehicle communication apparatus for a vehicle includes: a communicator configured to communicate with a server and adjacent vehicles; and a controller configured to store a position of the vehicle, configured to select one or more vehicles capable of performing a local communication in a reference distance from the stored position, configured to receive download quota from a first host vehicle selected from one or more vehicles, and configured to obtain data from the server as much as the received quota.

The controller may select a vehicle having the maximum signal strength as the host vehicle among the at least one vehicle capable of performing the local communication in the pre-selected distance from the stored position.

When the host vehicle is selected, the controller may divide a total download data amount by the number of vehicle (n) capable of performing the local communication, and distribute a download quota to each vehicle.

When some vehicle among the vehicles capable of performing the local communication is excluded, the controller may re-distribute a download quota, which is distributed to the excluded vehicle, to the remaining vehicles.

The controller may obtain a download quota, which is divided by the number of vehicle capable of performing the local communication, from the server, and the controller may transmit the obtained download quota to the at least one vehicle including the host vehicle.

When the host vehicle is excluded, the controller may newly select a host vehicle among at least one remaining vehicle, receive a download quota from the newly selected host vehicle, and obtain data from the server as much as the received quota.

When the host vehicle is newly selected, the controller may receive data, which is downloaded by the excluded vehicle and re-distribute a quota by the number of the at least one remaining vehicle (n−1).

The communicator may further include a first communication module configured to download data from the server and a second communication module configured to perform a local communication with an external vehicle.

The first communication module and the second communication module may be operated at the same time.

The controller may transmit a local communication request to a vehicle approaching the pre-selected distance region.

In accordance with another aspect of the disclosure, a control method of vehicle includes: storing, by a controller, a position of a vehicle; communicating, by a communicator, with adjacent vehicles capable of performing local communication in a reference distance from the stored position; selecting, by the controller, one or more vehicles capable of performing local communication in the reference distance from the stored position; receiving, by the controller, a download quota from a first host vehicle selected among the one or more vehicles; and obtaining, by the controller, data from a server as much as the received download quota.

The selection of the host vehicle may be performed by selecting a vehicle having the maximum signal strength as the host vehicle, among the at least one vehicle capable of performing the local communication in the pre-selected distance from the stored position.

The selection of the host vehicle may be performed by, when the host vehicle is selected, dividing a total download data amount by the number of vehicle (n) capable of performing the local communication, and distributing a download quota to each vehicle.

The reception of the download quota from the host vehicle may further include when some vehicle among the vehicles capable of performing the local communication is excluded, re-distributing a download quota, which is distributed to the excluded vehicle, to the remaining vehicles.

The reception of the download quota from the host vehicle may be performed by obtaining a download quota, which is divided by the number of vehicle capable of performing the local communication, from the server, and transmitting the obtained download quota to the at least one vehicle including the host vehicle.

The reception of the download quota from the host vehicle may further include, when the host vehicle is excluded, newly selecting a host vehicle among at least one remaining vehicle, receiving a download quota from the newly selected host vehicle, and obtaining data from the server as much as the received quota.

The reception of the download quota from the host vehicle may further include, when the host vehicle is newly selected, receiving data, which is downloaded by the excluded vehicle, and re-distributing a quota by the number of the at least one remaining vehicle (n−1).

The reception of the download quota from the host vehicle and the obtaining of data from the server as much as the received quota, may be operated in the same time.

The communicating with an adjacent vehicle capable of performing a local communication in a pre-selected distance from the stored position, may further include transmitting a local communication request to a vehicle approaching the pre-selected distance region.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Reference will now be made in detail to embodiments of the present disclosure, examples of which are illustrated in the accompanying drawings.

Figure 1:
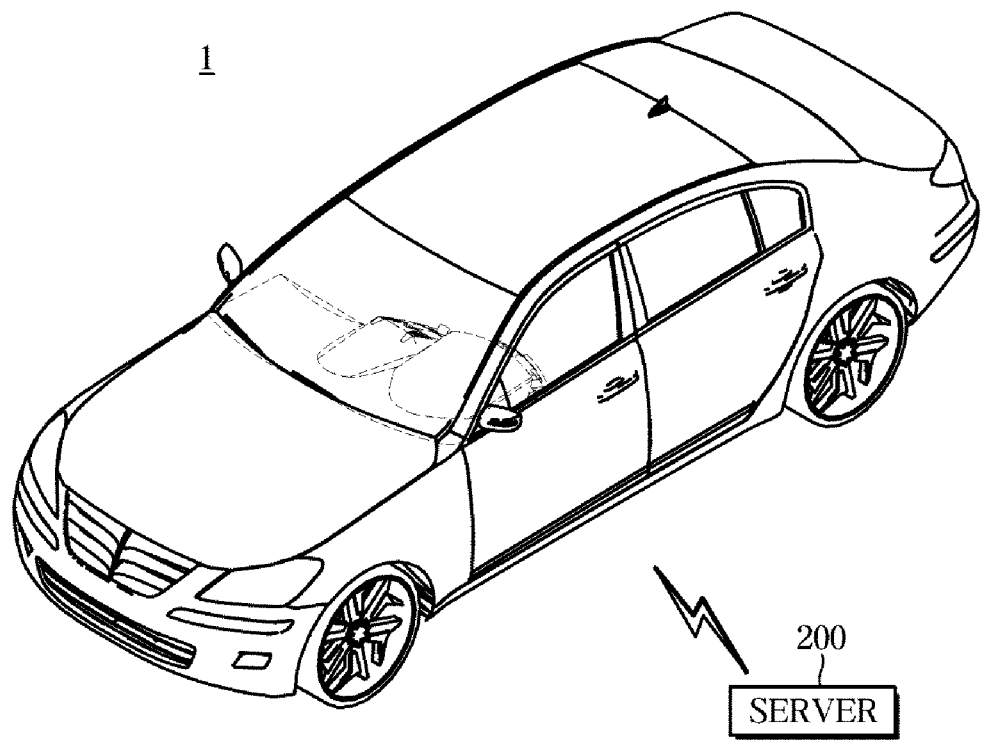
FIG. 1 is a view illustrating a vehicle according to an exemplary embodiment of the present disclosure.
Figure 2:
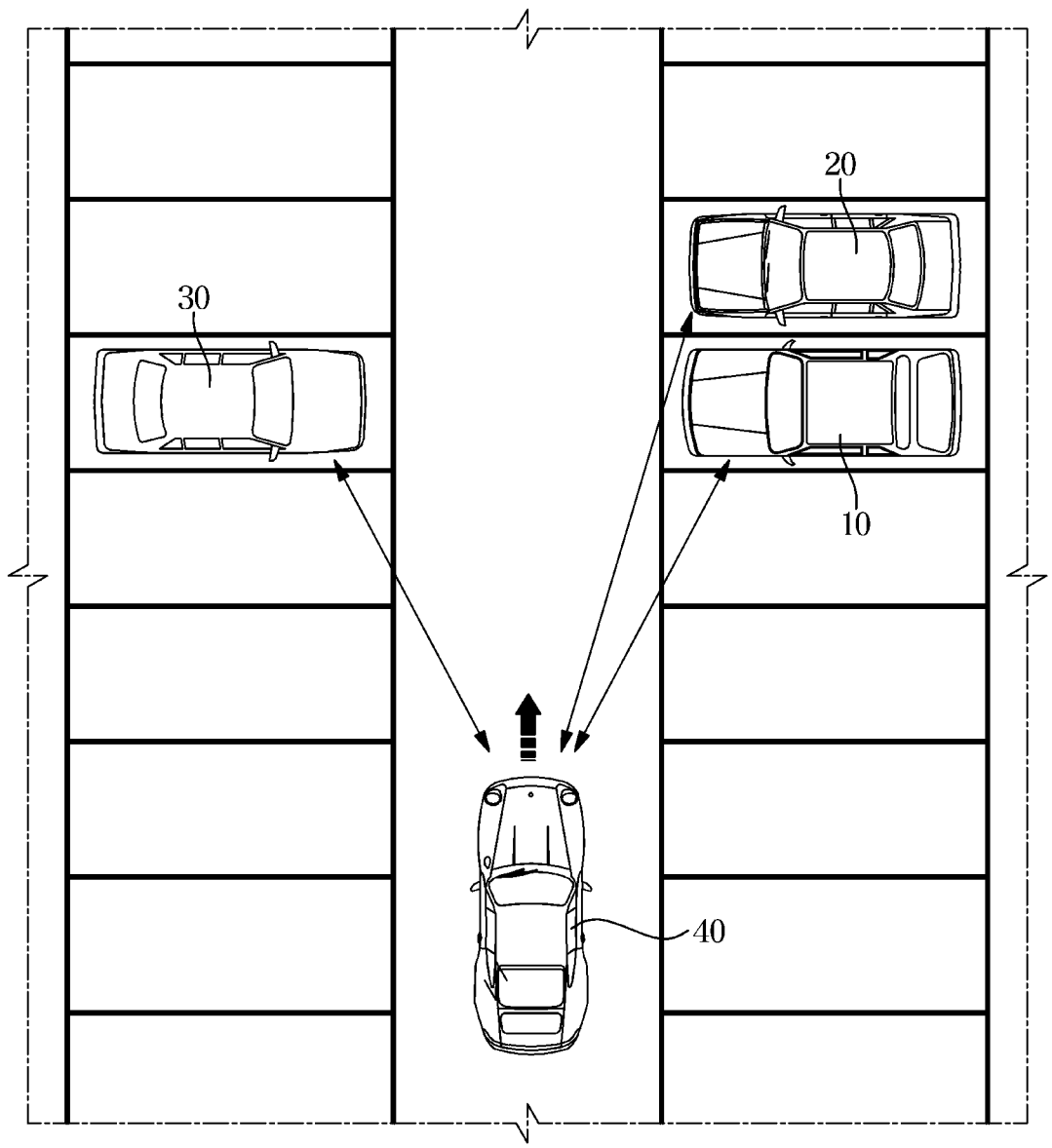
FIG. 2 is a view illustrating a communication state among a plurality of vehicles according to an exemplary embodiment of the present disclosure.
Figure 3:
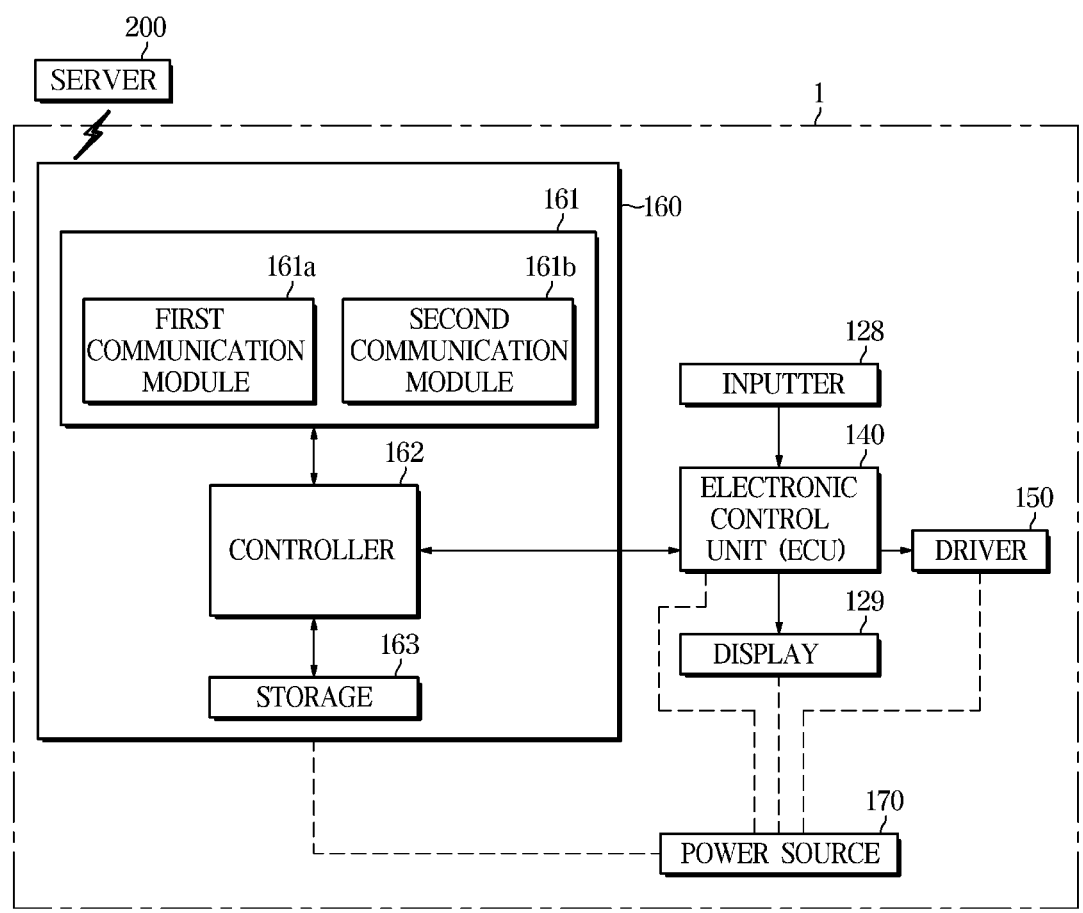
FIG. 3 is a control block diagram illustrating the vehicle according to an exemplary embodiment of the present disclosure.

FIG. 1 is a view illustrating a vehicle according to an embodiment, FIG. 2 is a view illustrating a communication state among a plurality of vehicles, and FIG. 3 is a control block diagram illustrating the vehicle according to an embodiment.

A vehicle 1 is an apparatus configured to move by driving vehicle wheels for the purpose of transportation of people or cargo. The vehicle 1 may include a body a having an interior and an exterior, and a chassis which is the rest of the vehicle aside from the body, and in which a mechanical apparatus is installed for the driving.

The vehicle 1 may further include a variety of safety devices for the safety of the driver and passenger.

The safety devices of the vehicle may include a variety of safety devices, such as an air bag control device for the safety of the driver and passenger when the collision of the vehicle, and an Electronic Stability Control (ESC) configured to maintain the stability of the vehicle when accelerating or cornering.

Further, the vehicle 1 may further include a detection device, e.g. a proximity sensor configured to detect an obstacle or another vehicle placed in the rear side or the lateral side of the vehicle and a rain sensor configured to detect whether to rain or an amount of rain.

The vehicle 1 may selectively include an electronic device such as a hand-free device, a GPS, an audio device, a Bluetooth device, a rear camera, a device for charging terminal device, and a high-pass device, which are installed for the convenience of the driver.

The vehicle 1 may further include a start button configured to input an operation command to a starter motor (not shown).

That is, when the start button is turned on, the vehicle 1 may turn on an starter motor (not shown) and drive an engine (not shown) that is the power generation device, by the operation of the starter motor.

Particularly, as illustrated in FIG. 1, the vehicle 1 may perform wireless communication with an external server 200. That is, the vehicle 1 may download data from the external server 200, based on firmware over the air (FOTA).

The vehicle 1 may include an Electronic Control Unit (ECU) 140 configured to control an operation of the power system, the power train, the driving device, the steering system, the brake system, the suspension system, the transmission device, the fuel system, the variety of safety devices, and the variety of sensors. The vehicle 1 may include a driver 150 configured to operate a variety of devices based on a command of the ECU 140.

Based on a command that is input via an inputter 128 or a command that is received via a communicator 161, the ECU 140 may control at least one of an air conditioner, a heating wire of seat, an indoor lamp, a headlight, a display 129, a starter motor, and a telematics terminal 160.

The vehicle 1 may further include the telematics terminal 160 configured to perform positioning, internet access, remote vehicle diagnosis, incident detection, traffic information, and communication service related to a home network, by using the communications and broadcasting networks. That is, as illustrated in FIG. 1, the telematics terminal 160 may download data based on the FOTA through wireless communication with the external server 200. As illustrated in FIG. 2, the telematics terminal 160 may control wireless communication among a plurality of vehicles. That is, the telematics terminal 160 may directly communicate with the server 200 of FIG. 1 or perform communication through the base station.

Further, the telematics terminal 160 may perform the wireless communication with the plurality of other vehicles shown in FIG. 2. As illustrated in FIG. 2, the telematics terminal 160 may allow wireless communication among a first vehicle 10, a second vehicle 20, a third vehicle 30, and a fourth vehicle 40 approaching a pre-selected distance. Particularly, the fourth vehicle 40 is configured to perform the wireless communication with the first vehicle 10 to the third vehicle 30. Although not shown, the first vehicle 10 is configured to perform the wireless communication with the second vehicle 20 to the fourth vehicle 40. The second vehicle 20 is configured to perform the wireless communication with the first vehicle 10, the third vehicle 30 and the fourth vehicle 40. The third vehicle 30 is configured to perform the wireless communication with the first vehicle 10, the second vehicle 20, and the fourth vehicle 40. FIG. 2 illustrates that the wireless communication among total four vehicles including stopped vehicles such as the first vehicle 10 to the third vehicle 30, and an approaching vehicle such as the fourth vehicle 40 within the pre-selected distance, but it may be possible to perform the wireless communication among less than or greater than four vehicles.

That is, the telematics terminal 160 may perform not only the communication among the various types of internal electronics and the communication with a user terminal corresponding to an external terminal, but also the wireless communication with other vehicle.

At this time, the telematics terminal 160 may include a CAN communication module, a Wi-Fi communication module, a USB communication module, and a Bluetooth communication module.

Further, the telematics terminal 160 may further include a GPS receiving module for acquiring position information from the satellite, and may further include a broadcasting communication module such as TPEG, SXM, and RDS such as DMB.

In addition, by using the telematics terminal 160, a user may remotely diagnose the vehicle, and access a variety of information such as traffic and living information and emergency rescue, via the wireless network. By using the telematics terminal 160, a user may transmit telephone messages to other users, as well as send and receive voice mail, and download an audio book, via the wireless network.

The telematics terminal 160 may perform a variety of services such as reception of news, stock investment, e-commerce, banking, hotel reservations, faxing, games, and a service related to vehicle accident and theft. Particularly, when a traffic accident occurs, the telematics terminal 160 may automatically tract a position of the vehicle using GPS satellites and transmit information related to the traffic accident to the nearest 119 rescue unit.

The vehicle 1 may further include a power source 170 electrically connected to the terminal, the audio device, the indoor lamp, the heating wire of seat, the headlight, the ECU and other electronics so as to supply power.

The power source 170 may refer to an electrical device that supplies electric power to an electrical load, and may correspond to a chargeable/dischargeable battery, and perform charging by using the power of the self-generator or the engine during driving.

A control configuration of the vehicle will be described in more detail with reference to FIG. 3.

FIG. 3 is a control block diagram illustrating the vehicle according to an embodiment.

As illustrated in FIG. 3, the vehicle 1 may include the inputter 128, the display 129, the electronic control unit (ECU) 140, the driver 150, the telematics terminal 160, and the power source 170.

The inputter 128 may receive a selection of a remote service mode, and a delay command of the remote service mode. The inputter 128 may be configured to receive at least one software update command. Here, the inputter 128 may refer to an input device which is a piece of computer hardware equipment used to provide data and control signals to an information processing system such as a computer or information appliance. Examples of input device includes keyboard, mouse, scanners, digital cameras, joysticks, etc.

The display 129 may display selection/release information of the remote service mode.

The display 129 may also display information related to the update notification message and output download information of the update file.

Here, the display 129 may refer to a display device which is an output device for presentation of information in visual or tactile form. Examples of the display device includes an electroluminescent (EL) display, liquid crystal (LC) display, Light-emitting diode (LED) display, etc.

The download information of the update file may include information related to corresponding software, an update file name, a total time required for downloading, an elapsed time, a remaining time, a total size of the update file, a downloaded file size, and a remaining file size, and further include a downloading date. The download information may be displayed as a progress bar.

The display 129 may also display information related to stopping download of the update file and display information related to re-downloading the update file.

The ECU 140 represents a controller that is an object to be updated using the FOTA. That is, when it needs to update data of the ECU 140, the ECU 140 may transmit a signal to the telematics terminal 160.

When the ignition is turned on, the ECU 140 may control the power source 170 so that the power source 170 supplies power for driving to the electronics.

When receiving an operation command signal in the remote service mode, the ECU 140 may control an operation of at least one device based on the received signal.

Based on a command that is input via the inputter 128 or a command that is received via the communicator 161, the ECU 140 may control at least one of the air conditioner, the heating wire of seat, the indoor lamp, the headlight, the display 129, the starter motor, and the telematics terminal 160, but is not limited thereto. Therefore, the ECU may control automotive electronics contained in the vehicle.

The driver 150 may drive at least one device based on a control command of the ECU 140.

The at least one device may include the power system, the power train, the driving device, the steering system, the brake system, the suspension system, the transmission device, the fuel system, the variety of safety devices, and the variety of sensors.

In the remote service mode, the driver 150 may drive the starter motor based on a control command of the ECU 140 to turn on the ignition and the indoor lighting, or operate the heating wire of the seat or the air conditioner. Here, the driver 150 may be a solenoid for generating a controlled magnetic field.

In a standby mode, the telematics terminal 160 may receive power from the power source 170 and communicate with at least one of the server 200, the user terminal, and a remote controller.

The telematics terminal 160 may include the communicator 161, a controller 162, and a storage 163.

Here, the communicator 161, the controller 162, and the storage 163 are well-known hardware devices. For example, the communicator 161 may be a communication device capable of transmitting analog or digital signal over the telephone, other communication wire, or wirelessly. The example of the communication device includes a computer modem, network interface card (NIC), Wi-Fi devices, an access point, etc. The controller 161 may be a processor such as a central processing unit (CPU) within a computer that carries out instructions of a computer program by performing the basic arithmetic, logic, controlling and input/output (O/I) operations specified by the instructions. The storage 163 may refer to a storage device that is used for storing, porting, and extracting data files and objects. Examples of the storage device includes RAM, cache, and hard disk, as well as optical disk drives, and externally connected USB drives.

The communicator 161 may include a first communication module 161a communicating with the server 200 to receive a software file and an update file, and a second communication module 161b transmitting/receiving data with at least one vehicle via the short range communication.

The first communication module 161a and the second communication module 161b may be the same communication method or different communication methods.

The controller 162 may acquire information, which is related to a unit requiring updating, from the ECU 140. Alternatively, the controller 162 itself in the telematics terminal 160 may be a unit requiring updating.

The controller 162 may store a parking state before the vehicle 1 is turned off. This is to identify whether the vehicle 1 is capable of communicating with other vehicle located within a pre-selected radius of the stored position.

Accordingly, the controller 162 may search for other vehicle capable of performing update by distributing with the vehicle placed in the pre-selected radius of the stored position, and the controller 162 may communicate with the corresponding other vehicle. For example, the controller 162 may perform negotiation among vehicles through the second communication module 161b.

Figure 4:
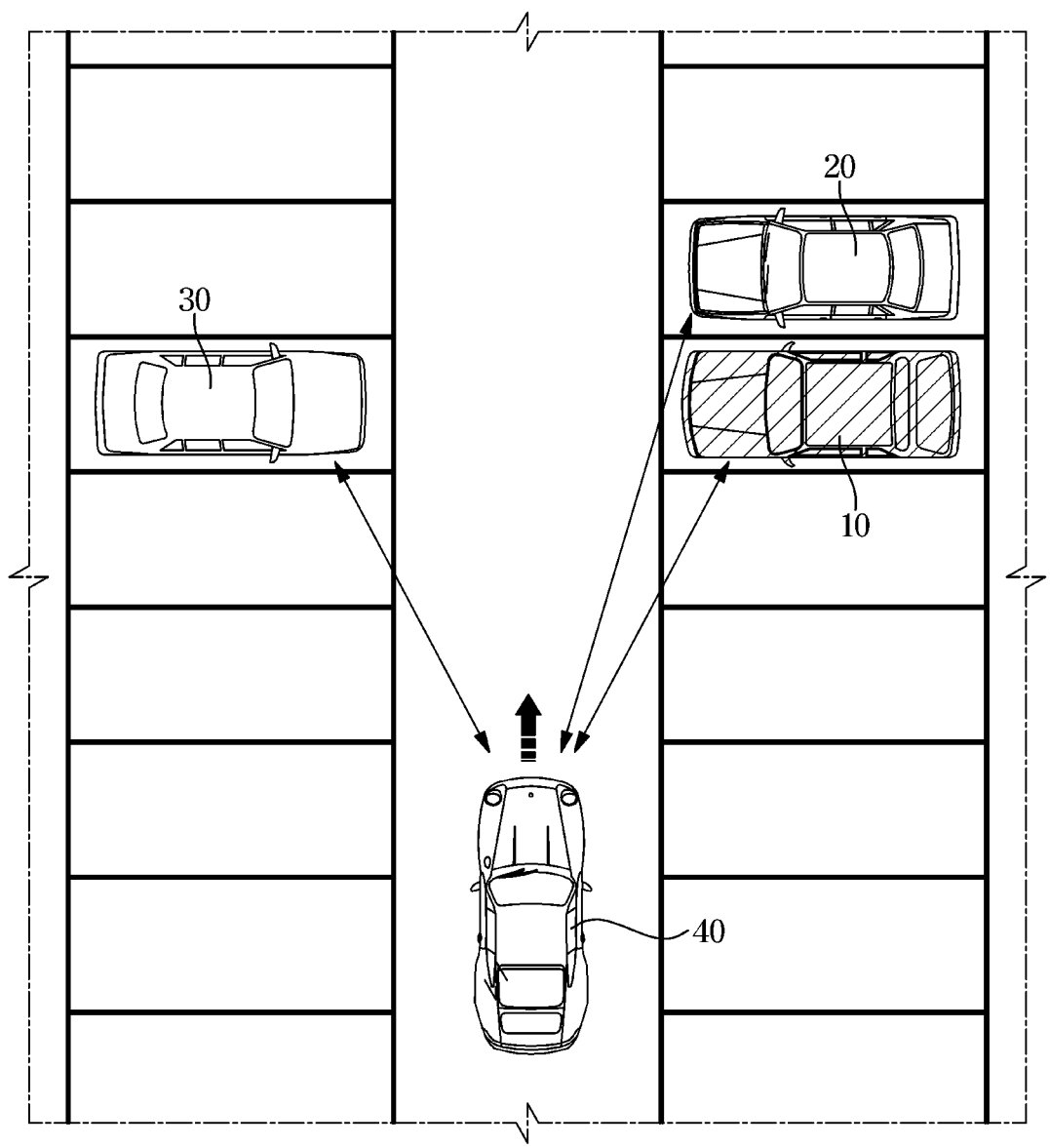
FIG. 4 is a view illustrating a negotiation state among the plurality of vehicles for selecting a host vehicle among the plurality of vehicles according to an exemplary embodiment of the present disclosure.

The negotiation among vehicles may represent selecting a particular vehicle as a host vehicle among vehicles performing the update. Particularly, FIG. 4 is a schematic view illustrates the communication among vehicles for selecting a host vehicle proceeding with update among the plurality of vehicles placed in a pre-selected region. A vehicle having the highest average signal may be selected as a host vehicle among participating vehicles, and the host vehicle may proceed with the communication. That is, it may be possible to select a vehicle capable of communicating with the largest number of vehicles, as a host vehicle.

For example, FIG. 4 illustrates that the first vehicle 10, on which diagonal lines are drawn, has the highest average signal, and thus the first vehicle 10 is selected as a host vehicle of the communication among the first vehicle 10 to the fourth vehicle 40.

The controller 162 of the first vehicle 10 selected as the host vehicle may perform the communication with the second vehicle 20 and the third vehicle 30 which are vehicles near a selected parking position. The controller 162 of the first vehicle 10 may receive information related to the fourth vehicle 40, which is approaching the corresponding position, from the server 200, and transmit a wake-up request to the fourth vehicle 40, thereby starting negotiation among the first vehicle 10 to the fourth vehicle 40.

However, in order to start the negotiation among vehicles, negotiable vehicles are needed to satisfy respective trigger conditions. At this time, the trigger condition may represent a minimum condition that allows a vehicle to perform an update of a specific unit, and the trigger condition may include a threshold time condition or a position condition such as placing in a threshold region.

Thereafter, FOTA image may be equally distributed to all vehicles, which participates the negotiation in which the first vehicle 10 is the host vehicle, by the host vehicle and the all vehicles may proceed with downloading from the external server 200.

At this time, downloading of each vehicle from the server 200 may be performed by the first communication module 161a in the telematics terminal 160, and downloaded data may be exchanged with a remaining part via a local communication. That is, the downloaded data may be exchanged through the second communication module 161b in the telematics terminal 160.

Therefore, when an over the air (OTA) image is divided and downloaded among the four vehicles such as the first vehicle 10 to the fourth vehicle 40 shown in FIG. 4, the first vehicle 10 to the fourth vehicle 40 may download a quarter (¼) of an image from the external server 200, respectively. For example, when it is designated that the first vehicle 10 downloads a first download segment occupying ¼ of the entire download data from the server 200, the second vehicle 20 downloads a second download segment occupying ¼ of the entire download data from the server 200, the third vehicle 30 downloads a third download segment occupying ¼ of the entire download data from the server 200, and the fourth vehicle 40 downloads a fourth download segment occupying ¼ of the entire download data from the server 200, the first vehicle 10 to the fourth vehicle 40 may download the corresponding first to fourth download segment from the external server 200 by the first communication module 161a, respectively and the first vehicle 10 to the fourth vehicle 40 may exchange each segment with each other.

Accordingly, the first vehicle 10 may transmit the first download segment to the second vehicle 20 to the fourth vehicle 40. The first vehicle 10 may receive the second download segment from the second vehicle 20, the third download segment from the third vehicle 30, and the fourth download segment from the fourth vehicle 40. In the same manner, the second vehicle 20 to the fourth vehicle 40 may also acquire the download segment by exchanging the download segment with each other.

However, when the vehicle other than the vehicle selected as the host (the first vehicle in FIG. 4) is excluded from the local communication network in the middle of the downloading, the controller 162 may control the host vehicle so that the host vehicle allows a segment, which is allocated to the excluded vehicle, to be divided and downloaded into the remaining vehicles. A description thereof will be described with reference to FIG. 8.

When the vehicle selected as the host is excluded from the local communication network in the middle of the downloading, the controller 162 may newly select a host through the negotiation among the remaining vehicles, and transmit the data, which is downloaded until now, to the newly selected host vehicle. Based on the transmission, the controller 162 may re-distribute the remaining data to be downloaded. A description thereof will be described with reference to FIG. 9.

The controller 162 may request an update file that has not yet been downloaded from the server 200.

In addition, the controller 162 may control the download of the update file based on the mobile communication standard.

For example, when the communication method is the 3G communication method, the controller 162 may store only information of the update notification message, and when the communication method is the LTE communication method, the controller 162 may download the update file.

When the communication method is the 3G communication method, the controller 162 may identify an update file size and when it is identified that the update file size is equal to or greater than a reference size, the controller 162 may receive and store the information of the update notification message. When it is identified that the update file size is less than the reference size, the controller 162 may download the update file.

When the communication method is the LTE communication method, the controller 162 may identify a strength of the received signal, and when it is identified that the identified signal strength is equal to or greater than a reference strength, the controller 162 may download the update file. When it is identified that the identified signal strength is less than the reference strength, the may receive and store the information of the update notification message.

However, the controller 162 may simultaneously perform data download through the first communication module 161a and data download through the second communication module 161b. Therefore, the controller 162 may increase download speed of the update data of the unit.

The control unit 162 of the telematics terminal 160 may be provided in the ECU 140.

The control unit 162 may be a processor such as a CPU or MCU, as described above.

The storage 163 may store software for performing at least one function and when the stored software is updated based on the command of the controller 162, the storage 163 may store the updated software.

The storage 163 may store not only a file allocated and downloaded by the host vehicle, but also a file allocated, which is received through the local communication.

The storage 163 may pre-store the current vehicle position information for negotiation among the vehicles and pre-store all the conditions for satisfying the trigger condition corresponding to the position information.

The storage 163 may be provided separately from the telematics terminal.

The storage 163 may further include volatile memories such as S-RAM and D-RAM and non-volatile memories such as a flash memory, a read only memory, an erasable programmable read only memory (EPROM), and an electrically erasable programmable read-only memory (EEPROM).

The power source 170 may supply power for driving to each of electronics in a general mode, and the power source 170 may supply power for driving to the telematics terminal 160 in the standby mode. The power source 170 may block power, which is supplied to all drivers, in an off mode.

The server 200 may perform the communication with a pre-registered vehicle 1.

The server 200 may store a software file for performing at least one function and an update file for each software, and whenever the update file is generated, the server 200 may transmit the update notification message to the vehicle 1. When receiving an update file provision request from the vehicle 1, the server 200 may transmit the update file to the vehicle 1.

When a request for identifying a non-downloaded file is received from the vehicle 1, the server 200 may provide information related to the update file for each software, to the vehicle.

The server 200 may store the information of the downloaded update file for each vehicle, and the server 200 may provide information related to the non-downloaded file to the vehicle, based on the information of the downloaded update file for each vehicle.

Figure 5:
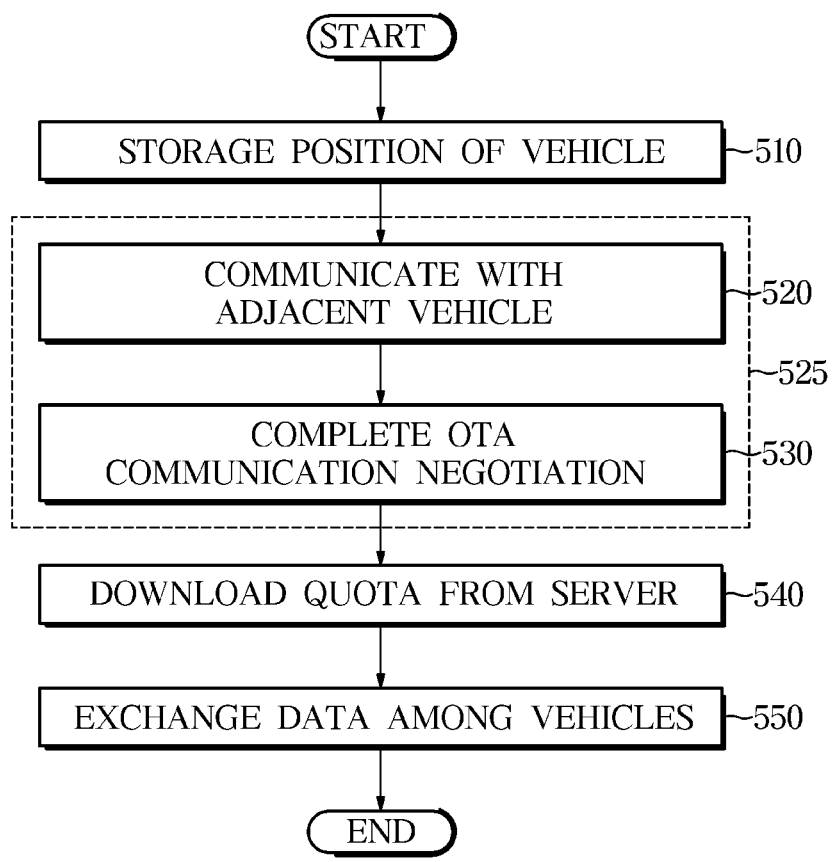
FIGS. 5 and 6 are flowcharts illustrating a update method of vehicle according to an exemplary embodiment of the present disclosure.
Figure 6:
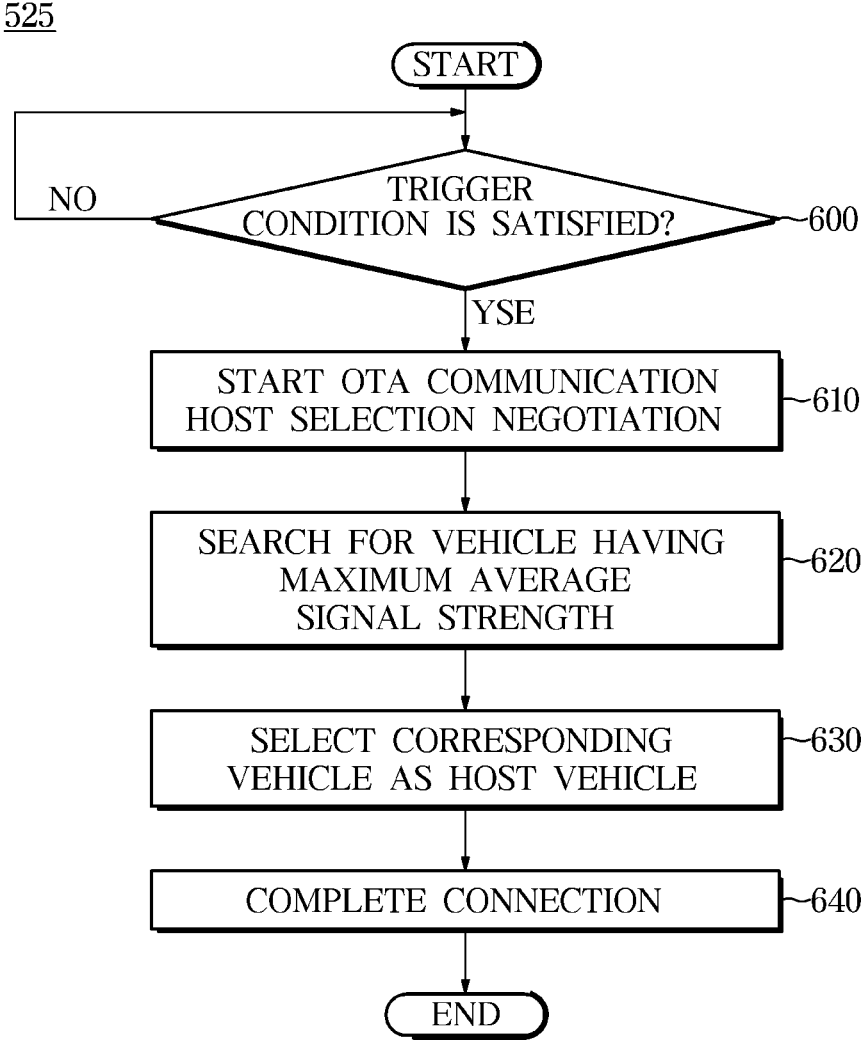

FIGS. 5 and 6 are flowcharts illustrating an update method of vehicle according to an embodiment.

Particularly, FIG. 5 illustrates that an operation for exchanging data among vehicles through a negotiation among vehicles when a particular unit in a single vehicle is updated, and FIG. 6 is a flowchart illustrating a communication negotiation method among vehicles, in detail.

First, as shown in FIG. 5, the vehicle 1 may store the position of the vehicle (510). At this time, storing the position of the vehicle may be performed to search for other vehicle that is capable of communicating with the vehicle within the pre-selected distance from the corresponding position, by transmitting the corresponding position to the server 200. Through the communication with adjacent vehicles, the vehicle 1 may complete a negotiation among vehicles for the OTA (FOTA) communication (520 and 530). The completion of the negotiation among vehicles may represent selecting a host vehicle configured to designate update quota, among the vehicles. A quota may be designated to a non-host vehicle by the host vehicle and the non-host vehicle may download the quota from the server 200. The host vehicle may download the designated quota from the server 200. Particularly, it may be possible to download the designated quota through the first communication module 161 of the telematics terminal 160 of the vehicle.

After downloading, a plurality of vehicles may complete data acquisition by exchanging data among vehicles (550).

Particularly, FIG. 6 is a detailed flowchart of a method in which through the communication with adjacent vehicles, the vehicle 1 may complete a negotiation among vehicles for the OTA (FOTA) communication (520 and 530). However, FIG. 6 also illustrates a control method of a vehicle among a plurality of vehicles. First, the vehicle 1 may identify whether a trigger condition is satisfied (600). At this time, the trigger condition may represent a state in which whether the negotiation is allowed among the vehicles, and the trigger condition may include a time condition and a position condition.

When the trigger condition is satisfied (yes in 600), the vehicle 1 may start the negotiation to select the host vehicle for the OTA communication (610). The vehicle 1 may search for a vehicle having the maximum average signal strength and then select the vehicle as the host vehicle (620 and 630). The vehicle having the maximum average signal strength may correspond to a vehicle on a position allowing a vehicle to communicate with the largest number of vehicles. Therefore, after selecting the host vehicle, the vehicle 1 may identify that the negotiation of the OTA communication is completed (640).

Figure 7:
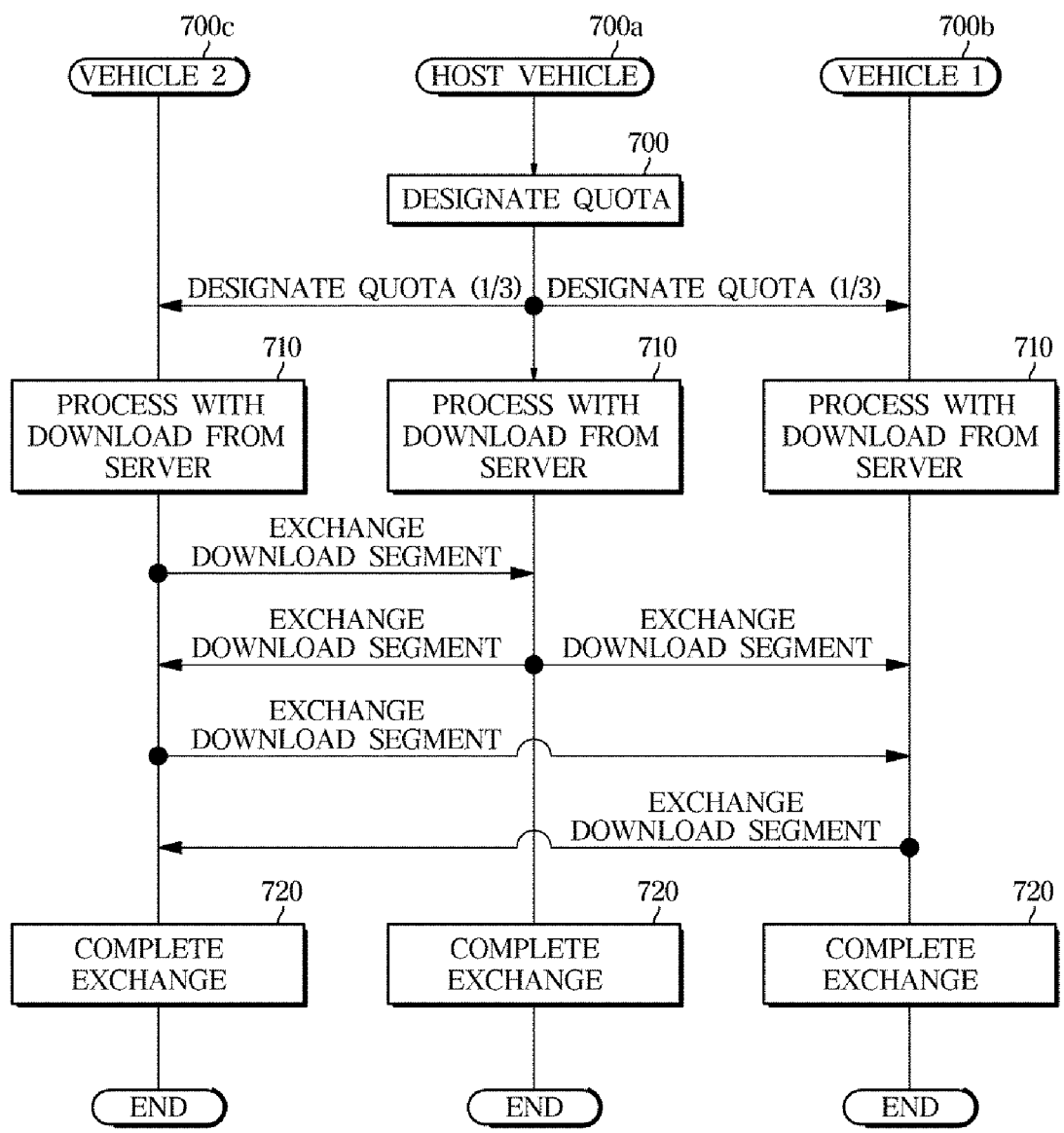
FIGS. 7 to 9 are flowcharts illustrating data-exchange method among the plurality of vehicles according to an exemplary embodiment of the present disclosure.
Figure 8:
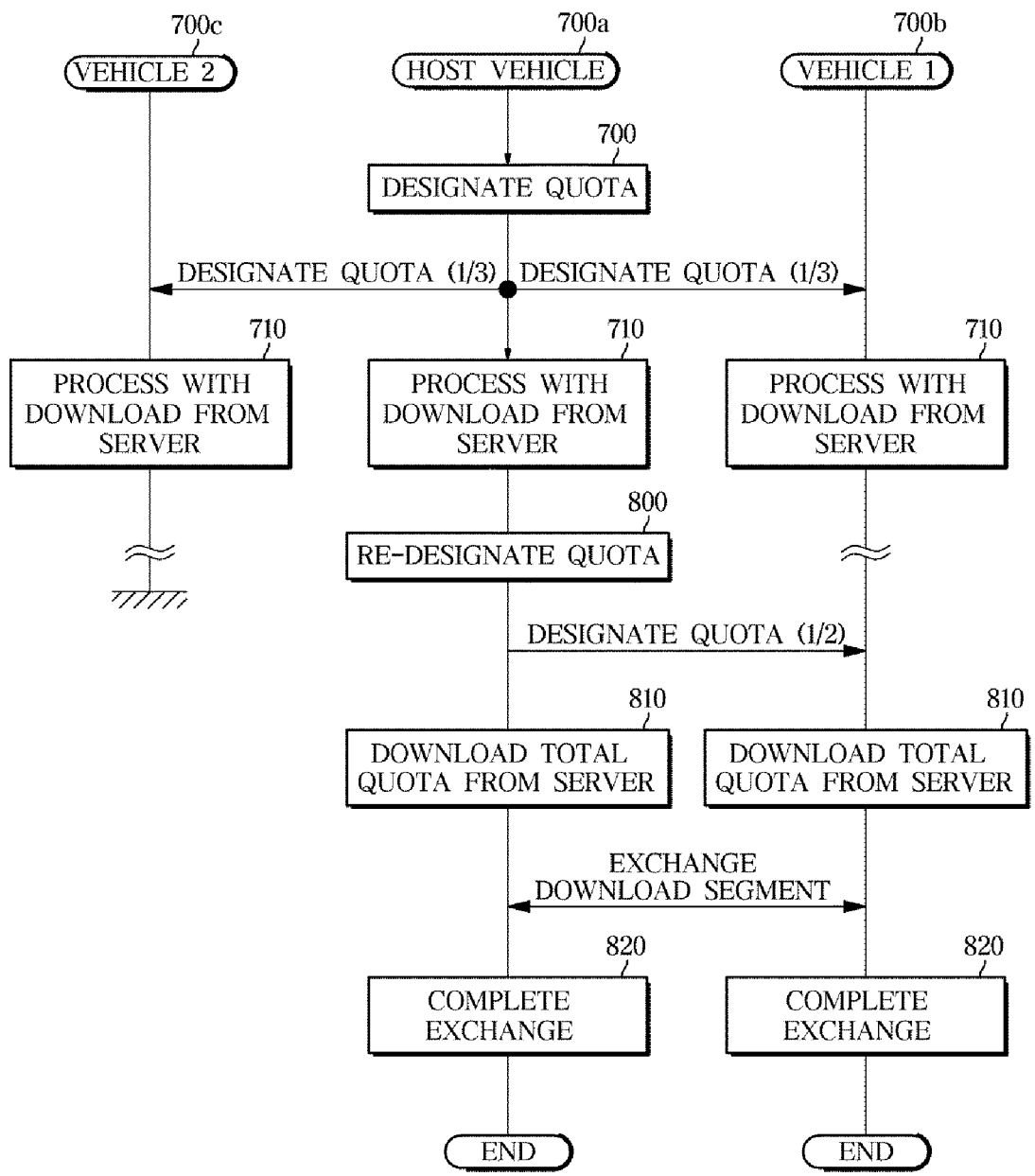
Figure 9:
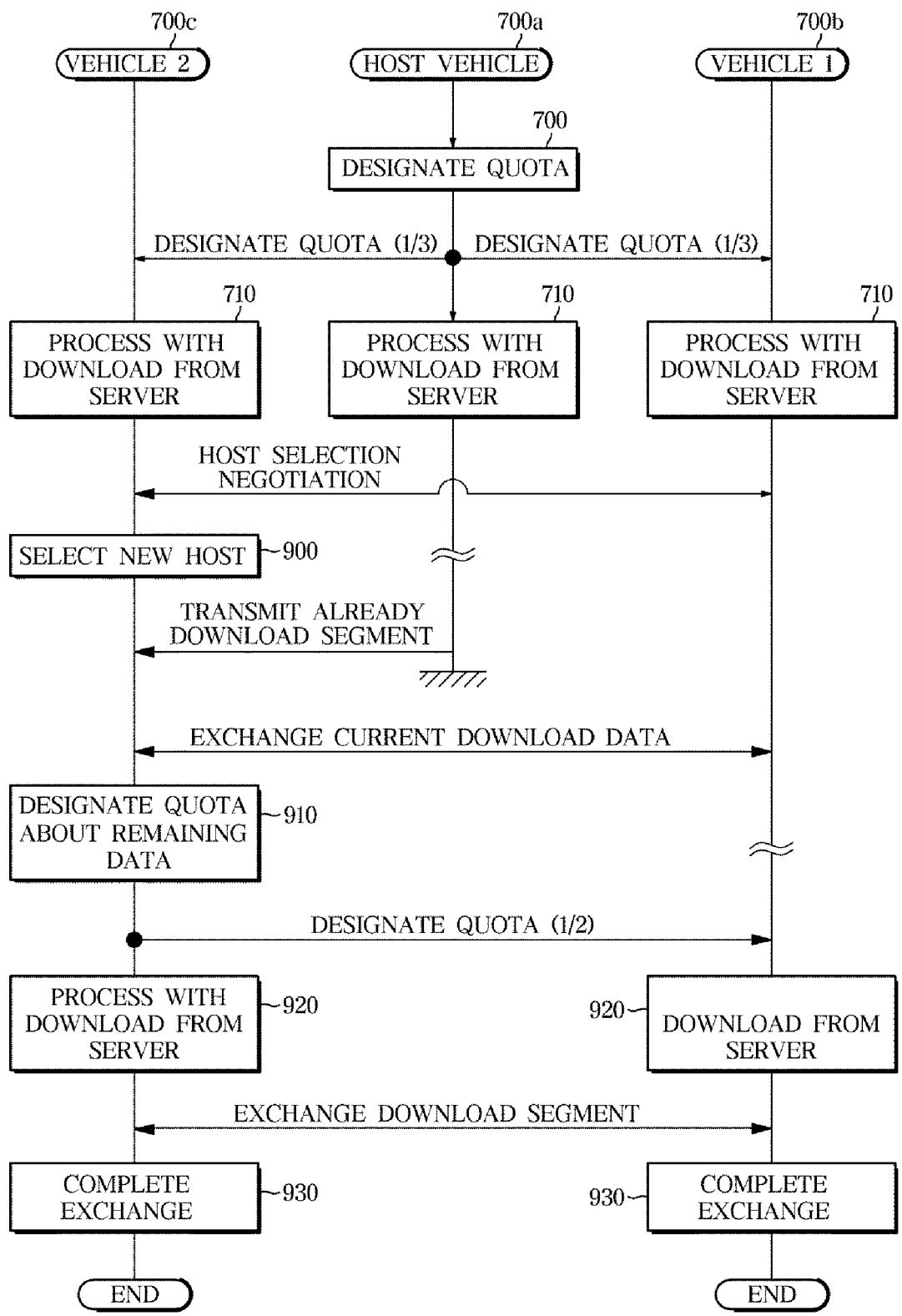

FIGS. 7 to 9 are flowcharts illustrating data-exchange method among the plurality of vehicles according to an exemplary embodiment of the present disclosure, FIG. 7 is an embodiment related to that data-exchange is completed by a host vehicle that is firstly selected, FIG. 8 is an embodiment related to that data-exchange is completed when a non-host vehicle is excluded, and FIG. 9 is an embodiment related to that data-exchange is completed when a host vehicle is excluded. However, FIGS. 7 to 9 illustrate the number of vehicles is three (n=3) in the case of the plurality of vehicles. However, this is an embodiment shown for the convenience of description. Therefore, when the trigger condition is satisfied, it may be possible for more large number of vehicles to obtain update data through the data-exchange.

In FIGS. 7 to 9, it is assumed that a host vehicle other than a vehicle 1 and a vehicle 2 is selected in advance. The method of selecting the host vehicle has described with reference to FIGS. 5 and 6.

The host vehicle 700a may designate a download quota for the vehicle 1 700b and the vehicle 2 700c corresponding to the remaining vehicles (700). The quota may be calculated by equally dividing the number of vehicles involved in the negotiation among the vehicles. According to an embodiment of FIG. 7, the quota corresponding to one third (⅓) may be designated to each vehicle.

Therefore, each vehicle may proceed with downloading from the server with respect to the quota (710). The each vehicle may exchange the download segment with each other. That is, the vehicle 2 may transmit the download segment to the host vehicle and the vehicle 1. The host vehicle may transmit the download segment to the vehicle 1 and the vehicle 2. The vehicle 1 may transmit the download segment to the host vehicle and the vehicle 2.

The exchange of the download segment among the vehicles may be performed through the local communication, and thus the exchange of the download segment among the vehicles may be performed through the second communication module 161b of the telematics terminal 160.

When the exchange of the download is completed, the each vehicle may complete the acquisition of the update data (720).

However, as shown in FIG. 8, when the non-host vehicle 700c is excluded in the middle of process in which the host vehicle 700a designates a download quota for the remaining vehicles 700b and the vehicle 2 700c corresponding to the remaining vehicles (700) and each vehicle may proceed with downloading from the server with respect to the quota, the host vehicle 700a may re-designate the quota of the vehicle 2 which is currently excluded (800). That is, the quota corresponding to one third (⅓), which is designated to the vehicle 2 currently excluded, may be designated to the remaining vehicles (the host vehicle and the vehicle 1) and thus a quota corresponding to one sixth (⅙) may be further designated to the remaining vehicles (the host vehicle and the vehicle 1). Therefore, a half (½) of the entire download data may be designated to the host vehicle and the vehicle 1, respectively.

Therefore, the host vehicle 700a and the vehicle 1 700b may proceed with downloading from the server 200 with respect to the quota (810). The each vehicle may exchange the download segment with each other. In this time, the exchanged download segment may be a half (½) of the entire download data (the number of involved vehicles is two; n=2). That is, the vehicle 1 700b may transmit the download segment to the host vehicle 700a. The host vehicle may transmit the download segment to the vehicle 1 and the vehicle 2. The vehicle 1 may transmit the download segment to the host vehicle and the vehicle 2.

The exchange of the download segment among the vehicles may be performed through the local communication, and thus the exchange of the download segment among the vehicles may be performed through the second communication module 161b of the telematics terminal 160.

When the exchange of the download is completed, the each vehicle may complete the acquisition of the update data (820).

FIG. 9 is a flowchart illustrating a method of designating a download quota when the host vehicle is excluded.

Particularly, at an early stage of FIG. 9, the host vehicle 700a may designate a download quota for the vehicle 1 700b and the vehicle 2 700c corresponding to the remaining vehicles (700), and each vehicle may proceed with downloading from the server with respect to the quota (710), in the same manner as FIG. 8. When the host vehicle 700a is excluded, a negotiation may be performed to newly select the host vehicle and thus the new host vehicle may be selected (900).

In FIG. 9, it is assumed that the vehicle 700c is the newly selected host vehicle. Therefore, the vehicle 700a corresponding to the first host vehicle may transmit the segment, which is downloaded until now, to the next host. However, when the first host vehicle 700a is not allowed to perform the local communication until the negotiation for selecting the next host vehicle 700c is completed, the first host vehicle 700a may not transmit the segment that is already downloaded.

The next host vehicle 700c may newly designate a quota for the remaining data in consideration of the segment that is already downloaded and transmitted from the first host vehicle 700a (910). When the segment that is already downloaded is not transmitted from the first host vehicle 700a, a half (½) of the entire download data may be designated.

Therefore, the host vehicle 700c and the vehicle 1 700b may proceed with downloading from the server 200 with respect to the quota (920). The each vehicle may exchange the download segment with each other. In this time, the exchanged download segment may be a half (½) of the entire download data (the number of involved vehicles is two; n=2). That is, the vehicle 1 700b may transmit the download segment to the host vehicle 700c. The host vehicle 700c may transmit the download segment to the vehicle 1 700a.

The exchange of the download segment among the vehicles may be performed through the local communication, and thus the exchange of the download segment among the vehicles may be performed through the second communication module 161b of the telematics terminal 160.

When the exchange of the download is completed, the each vehicle may complete the acquisition of the update data (930).

As is apparent from the above description, according to the vehicle and a control method of vehicle, it may be possible to reduce the communication cost and the time required for the download, since data amount, which is needed for the update, is distributed into adjacent vehicles and downloaded upon the FOTA update, which is remotely performed from the server, in the vehicle standby mode.

Therefore, it is possible to avoid the cost due to the additional CDN extension in order to maintain the download speed of the increasing image data.

In addition, the user may simultaneously perform data-exchange by using a local network among a plurality of vehicles through the communication among the plurality of vehicles, and download data through the FOTA communication network (3G, 4G, and 5G), thereby increasing the downloading speed.

It may be possible to update the internal software, even when the vehicle is parked for long time. Therefore, when performing at least one function, it may be possible to perform normally at least one function and it may be possible to perform at least one function in an optimized state.

In addition, it may be possible to improve the quality of the terminal, and to enhance user satisfaction, thereby improving the convenience of the user and the safety of the vehicle.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle-to-vehicle communication apparatus for a vehicle comprising:
    a communicator configured to communicate with a server and adjacent vehicles; and
    a controller configured to:
        store a position of the vehicle;
        select one or more vehicles, among the adjacent vehicles, wherein the one or more vehicles are capable of performing local communication with the vehicle within a reference distance from the stored position;
        receive download quota from a first host vehicle selected from the one or more vehicles; and
        obtain data from the server as much as the received quota,
    wherein the controller selects one vehicle, among the one or more vehicles, having a maximum signal strength as the first host vehicle.

2. The vehicle-to-vehicle communication apparatus of claim 1, wherein, when the first host vehicle is selected, the controller divides a total download data amount by a number of the one or more vehicles capable of performing local communication, and distributes download quota to each of one or more vehicles.

3. The vehicle-to-vehicle communication apparatus of claim 2, wherein, when one of the one or more vehicles is excluded, the controller re-distributes download quota, distributed to the excluded vehicle, to remaining vehicles of the one or more vehicles.

4. The vehicle-to-vehicle communication apparatus of claim 1, wherein the controller obtains download quota, which is divided by the number of one or more vehicles capable of performing local communication, from the server, and transmits the obtained download quota to the one or more vehicles including the first host vehicle.

5. The vehicle-to-vehicle communication apparatus of claim 4, wherein, when the first host vehicle is excluded, the controller newly selects a second host vehicle among the one or more vehicles, receives download quota from the second host vehicle, and obtains data from the server as much as the received quota.

6. The vehicle-to-vehicle communication apparatus of claim 5, wherein, when the second host vehicle is newly selected, the controller receives data, which is downloaded by the first host vehicle, and re-distributes download quota by a number of remaining vehicle among the one or more vehicles.

7. The vehicle-to-vehicle communication apparatus of claim 1, wherein the communicator further comprises:
    a first communication module configured to download data from the server; and
    a second communication module configured to perform local communication with the adjacent vehicles.

8. The vehicle-to-vehicle communication apparatus of claim 7, wherein the first communication module and the second communication module are simultaneously operated.

9. The vehicle-to-vehicle communication apparatus of claim 1, wherein the controller transmits a local communication request to a vehicle approaching to be within reference distance.

10. A method for controlling vehicle-to-vehicle communication of vehicle comprising steps of:
    storing, by a controller, a position of the vehicle;
    communicating, by a communicator, with adjacent vehicles capable of performing a local communication within a reference distance from the stored position;
    selecting, by the controller, one or more vehicles among the adjacent vehicles capable of performing the local communication;
    receiving, by the controller, download quota from a first host vehicle selected from the one or more vehicles; and
    obtaining, by the controller, data from a server as much as the received download quota,
    wherein the step of selecting includes a step of selecting a vehicle, among one or more vehicles, having a maximum signal strength as the first host vehicle.

11. The method of claim 10, wherein the step of selecting a vehicle as the first host vehicle includes:
    when the first host vehicle is selected, dividing a total download data amount by a number of the one or more vehicles, and
    distributing download quota to each of the one or more vehicles.

12. The method of claim 11, wherein the step of receiving download quota from a first host vehicle further comprises, when one vehicle among the one or more vehicles is excluded, re-distributing download quota, distributed to the excluded vehicle, to remaining vehicles among the one or more vehicles.

13. The method of claim 10, wherein the step of receiving download quota from a first host vehicle includes steps of:
    obtaining download quota, which is divided by a number of the one or more vehicles, from the server, and
    transmitting the obtained download quota to the one or move vehicles including the first host vehicle.

14. The method of claim 13, wherein the step of receiving download quota from a first host vehicle further comprises steps of:
    when the first host vehicle is excluded, newly selecting a second host vehicle among the one or more vehicles,
    receiving download quota from the second host vehicle, and
    obtaining data from the server as much as the download quota received from the second host vehicle.

15. The method of claim 14, wherein the step of receiving download quota from a first host vehicle further comprises steps of:
    when the second host vehicle is newly selected, receiving data, which is downloaded by the first host vehicle, and
    re-distributing download quota by a number of at least one remaining vehicle among the one or more vehicles.

16. The method of claim 10, wherein the step of receiving download quota and the step of obtaining data from the server are simultaneously operated.

17. The method of claim 10, wherein the step of communicating with adjacent vehicles further comprises a step of transmitting a local communication request to a vehicle approaching to be within the reference distance.

* * * * *